United States Patent
Sato et al.

[11] Patent Number: 5,842,548
[45] Date of Patent: Dec. 1, 1998

[54] ONE-WAY CLUTCH

[75] Inventors: Naoto Sato, Kosai; Naoto Oono, Wako; Masatoshi Akagi, Wako; Toshio Kimura, Wako, all of Japan

[73] Assignees: Fuji Univance Corporation, Kosai; Honda Giken Kogyo Kabushiki Kaisha, Tokyo, both of Japan

[21] Appl. No.: 828,547

[22] Filed: Mar. 31, 1997

Related U.S. Application Data

[60] Provisional application No. 60/029,945 Nov. 8, 1996.

[30] Foreign Application Priority Data

| Apr. 25, 1996 | [JP] | Japan | 8-131229 |
| Jul. 9, 1996 | [JP] | Japan | 8-199797 |
| Jul. 9, 1996 | [JP] | Japan | 8-199798 |

[51] Int. Cl.$^6$ ............................................. F16D 41/07
[52] U.S. Cl. .................... 192/45.1; 192/41 A; 192/42
[58] Field of Search ........................ 192/45.1, 41 A, 192/42; 188/82.1, 82.6, 82.8

[56] References Cited

U.S. PATENT DOCUMENTS

| 4,360,093 | 11/1982 | Wakabayashi et al. | 192/45.1 X |
| 4,373,620 | 2/1983 | Zlotek | 192/45.1 X |
| 5,070,976 | 12/1991 | Zlotec | 192/45.1 |
| 5,156,245 | 10/1992 | Fujiwara et al. | 192/45.1 X |
| 5,275,261 | 1/1994 | Vranish | 192/45.1 X |

*Primary Examiner*—Charles A. Marmor
*Assistant Examiner*—Saúl J. Rodríguez
*Attorney, Agent, or Firm*—Wenderoth, Lind & Ponack, L.L.P.

[57] ABSTRACT

When an assembly in which a sprag is temporarily assembled to a retainer by a return spring is assembled between an outer race and an inner race, even if the sprag projecting from the retainer is depressed, a drop-out of the sprag is prevented by a retaining member of a friction plate fixed to the end portion of the retainer. A lubrication passage is formed by opening a space surrounded by the outer race, retainer, and sprag to the outer peripheral side. An attaching member of the friction plate which is fixed to the retainer by a spot welding is recessed backward by joggling in a downward stairway manner for a contact surface. Therefore, even if a rise occurs in the attaching member by the welding, the rise is not come into contact with the contact surface. A corner edge is formed in a spherical shape in a manner such that when the corner edge of each of the frictional members divisionally formed on the outer periphery of the friction plate is dropped into a rivet hole of the attaching surface and, when it comes out from the rivet hole, the corner edge does not thrust into the periphery of the hole.

10 Claims, 13 Drawing Sheets

ONE-WAY CLUTCH

This application claims benefit of USC Provisional Applicaion No. 60/029,945, filed Nov. 8, 1996.

BACKGROUND OF THE INVENTION

The present invention relates to a one-way clutch for transmitting a torque only in one direction by operations of a number of sprags interposed between an outer race and an inner race and, more particularly, to a one-way clutch having a structure for enabling the clutch to be easily assembled to an engine for an automobile or the like.

Hitherto, in an engine for an automobile, a one-way clutch is used as a power transmitting mechanism for transmitting a rotation of a starter motor to a crank shaft and starting the engine. The one-way clutch transmits the rotation of the starter motor to the crank shaft of the engine and can start the engine. Since the starter motor is stopped after the engine was started, a torque from the crank shaft is not transmitted to the stopped starter motor.

Figure 1:
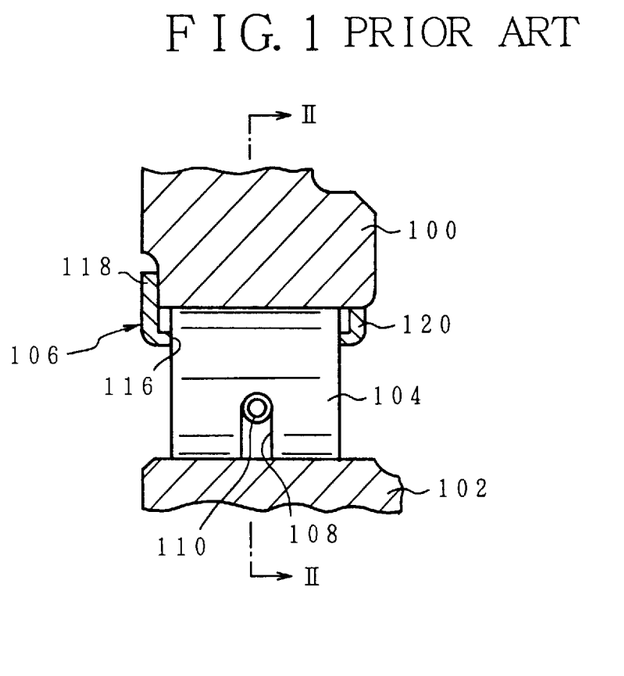
FIG. 1 is a cross sectional view showing a part of a conventional one-way clutch.
Figure 2:
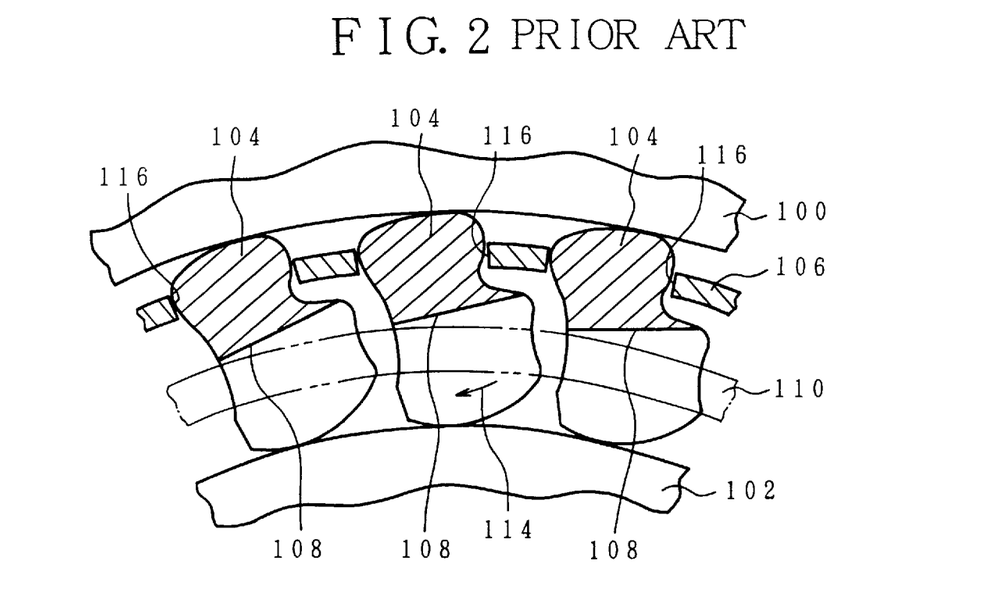
FIG. 2 is a cross sectional view taken along the line II—II in FIG. 1.

FIG. 1 shows a part of a conventional one-way clutch. FIG. 2 is a cross sectional view taken along the line II—II in FIG. 1. In the one-way clutch, an inner race 102 is coaxially arranged on the inside of an outer race 100. A number of sprags 104 are arranged between the outer race 100 and inner race 102 by retainers 106 at a predetermined pitch in the circumferential direction. In the sprag 104, a groove 108 extending in the circumferential direction for the retainer 106 is formed at the center on the inner peripheral side. A return spring 110 obtained by making a coil spring in a ring shape is inserted into the groove 108. Each sprag 104 is depressed in the radial direction. The sprag 104 is urged so as to revolve clockwise as shown by an arrow 114. The retainer 106 is formed by punching a steel plate member by a press machine and, thereafter, contracting it. Rectangular retaining holes 116 are. formed at a predetermined pitch in the circumferential direction of a ring-shaped band member. The sprag 104 is fitted into the retaining hole 116 from the inside and the outer peripheral end portion is rotatably retained. Flanges 118 and 120 are formed on both sides of the retainer 106 so as to be outwardly projected, thereby allowing the retainer 106 to be come into engagement with the outer race 100 side in a frictional contact manner.

In such a conventional one-way clutch, however, upon assembly, each sprag 104 is fitted into the retaining hole 116 of the retainer 106 from the inside and the return spring 110 is subsequently fitted into the groove 108 of each sprag 104, thereby temporarily combining with the retainer assembly. The retainer assembly is assembled between the outer race 100 and the inner race 102.

However, according to the retainer assembly, the outer peripheral end portion of each sprag 104 is largely projected to the outside from the retaining hole 116 of the retainer 106 by the pressing force in the radial direction by the return spring 110. The retainer assembly becomes larger than the inner diameter of the outer race 100, so that it is difficult to assemble the retainer assembly between the outer race 100 and the inner race 102. When the sprag 104 is inadvertently depressed into the inside upon assembly, the sprag 104 is disengaged and dropped out from the retaining hole 116 of the retainer 106 and the retainer assembly has to be reassembled. There are consequently problems such that a skill is necessary to assemble the one-way clutch and a work burden is large.

SUMMARY OF THE INVENTION

According to the invention, a one-way clutch having a structure in which the clutch can be easily assembled without needing a skill is provided.

According to the invention, a one-way clutch which is interposed between first and second rotary members which relatively rotate and transmits a torque only in one direction is provided. The one-way clutch comprises: an outer race connected to the first rotary member; an inner race which is coaxially arranged on the inner side of the outer race via a predetermined ring-shaped gap and is fixed to the second rotary member; a plurality of sprags which are assembled in the ring-shaped gap between the outer race and the inner race and arranged in the circumferential direction; and a retainer in which retaining holes for enclosing the plurality of sprags are formed in the circumferential direction at predetermined intervals and the sprags are rotatably arranged in the circumferential direction at a predetermined pitch in the ring-shaped gap between the outer race and the inner race in a state where the sprags are assembled in the retaining holes from the inner side. The plurality of sprags assembled in the retaining holes of the retainer are urged in the radial direction from the inner peripheral side by a ring-shaped return spring. The sprags are arranged so as to be rotatable in such a direction as to make the outer race and the inner race to be come into engagement with each other.

In addition to such a basic structure of the one-way clutch, according to the invention, a friction plate which is fixed to the end surface of the retainer, is sandwitched between the first rotary member and the outer race, and causes a friction to restrict a slide of the retainer and the sprags for the outer race is newly provided. Therefore, when the torque to be transmitted from the inner race to the outer race becomes excessive during the operation of the one-way clutch and exceeds a frictional force generated in the friction plate, the friction plate, retainer, and sprags cause a slide for the outer race, thereby preventing a transmission of the excessive torque.

In each of the plurality of sprags, a retaining groove extending in the circumferential direction is formed on each end surface locating on the friction plate arrangement side. A plurality of retaining members which are positioned so as to be projected in the retaining grooves of the sprags and restrict the drop-out of each sprag upon assembly are integratedly formed. Each of the retaining members of the friction plate has a triangular shape in which the width is gradually narrowed toward the tip. When the retainer assembly in which the sprags are temporarily assembled to the retainer by the return spring is assembled between the outer race and the inner race, even if the sprags outwardly projected from the retainer are depressed, a drop-out of the sprags is prevented by the retaining members provided for the friction plate. Consequently, the retainer assembly can be easily assembled between the outer race and the inner race. Since the retaining member of the friction plate has the triangular shape in which the width is gradually narrowed toward the tip, the retaining member locating in the retaining groove of the sprag is not inadvertently come into contact with the sprag during the operation of the sprag, thereby guaranteeing a smooth operation of the sprag.

According to the invention, a one-way clutch having a construction which improves a lubrication and a discharge of dusts from a space surrounded by the outer race, retainer, and sprags without causing a deterioration in strength of the outer race and a rise in costs. That is, according to the one-way clutch of the invention, a pair of flanges which are fitted into the outer race positioning in the outside are integratedly formed on both side edges of the retainer and a space surrounded by the outer race, retainer, and sprag is formed. A lubrication passage for communicating the space surrounded by the outer race, retainer, and sprag with the outside and recirculating a lubricating oil is provided for each of the pair of flanges formed on both sides of the retainer. As a lubrication passage, a notch is formed in each of the pair of flanges provided at both side edges of the retainer. Further, grooves for communicating the notch formed on one of the flanges of the outer race with the space of the outer periphery are formed on the end surface and the outer peripheral surface of the outer race fixed to the first rotary member. By forming such a lubrication passage, a flowability of the internal lubricating oil is secured and a lubricating performance is improved even if a through hole which penetrates the outer race is not worked. Simultaneously, stagnation of dusts is prevented and a damage of the sprag is prevented. Thus, a hole opening process of the outer race is made unnecessary, working costs are reduced, and a durability can be maintained and improved by the improvement in the lubricating performance and the discharge of the dusts.

According to the invention, there is also provided a one-way clutch having a structure which stabilizes operating characteristics of the clutch by preventing a situation such that a rise which is formed by spot welding the friction plate to the flange of the retainer is come into contact with the first rotary member and an unexpected frictional force is generated. In the friction plate which is used in the one-way clutch according to the invention, slits in the radial direction are formed on the outer periphery at predetermined intervals, thereby dividing the outer periphery into a plurality of regions. In each of the divided regions, an attaching member to be fixed to the outer race by a spot welding and a frictional member which is sandwiched between the first rotary member and the outer race and generates a friction to restrict a slide of the retainer and sprags for the outer race are alternately formed. In this case, when the attaching member of the friction plate is fixed as it is to the flange of the retainer by the spot welding, a rise is formed on the outer surface of the attaching member by the spot welding. The rising portion of the attaching member is come into contact with the attaching surface of the first rotary member in a clutch assembling state. An expected frictional contact except the contact by the frictional member is consequently caused, so that operating characteristics of the one-way clutch such that the transmission of an excessive torque is prevented by causing the clutch to slide go wrong. According to the invention, therefore, the welding portion of the attaching member of the friction plate is recessed and deviated to the retainer side by joggling in a downward stairway manner for the attaching surface of the first rotary member and is spot welded to the retainer side in a state where a gap is formed between the welding portion and the attaching surface of the first rotary member in the assembling state. The rise formed by the spot welding is positioned in the downward stairway-shaped gap so as not to be come into contact with the rotary member, thereby stabilizing the operating characteristics of the clutch.

Further, according to the invention, there is also provided a one-way clutch having a structure such that a thrust occurring when a slide occurs in the one-way clutch by receiving an excessive torque and a corner edge of the frictional member formed on the outer periphery of the friction plate drops into and comes out from a rivet hole of the attaching surface of the first rotary member to which the outer race is fixed is prevented and that a friction which determines a limit of a transmission torque is stabilized. In the frictional member formed in the outer peripheral portion of the friction plate, curved ribs which are come into contact with the attaching surface of the first rotary member are formed in the circumferential direction. Further, the portion of the curved rib locating at the corner edge of the frictional member partitioned by slits in the radial direction is formed in a spherical shape. Therefore, when the corner edge of the frictional member drops into and comes out from the rivet hole of the attaching surface, since the corner edge of the curved rib is formed in the spherical shape, a thrust into the periphery of the rivet hole can be prevented. The frictional member can be come into frictional contact with the first rotary member with an almost uniform force, thereby stabilizing the friction which determines the limit value of the transmission torque.

Further, in the one-way clutch of the invention, the first rotary member is a connecting member for connecting the outer race to the axial end of the crank shaft of the engine and the second rotary member is a starter gear fixed to the inner race which is rotatably attached to the end portion of the crank shaft of the engine for a vehicle via a bearing. Further, a rotor of an AC generator is fixed to the connecting member for connecting the outer race to the crank shaft.

The above and other objects, features, and advantages of the prevent invention will become more apparent from the following detailed description with reference to the drawings.

DETAILED DESCRIPTION OF THE PREFERRED EMBODIMENT

Figure 3:
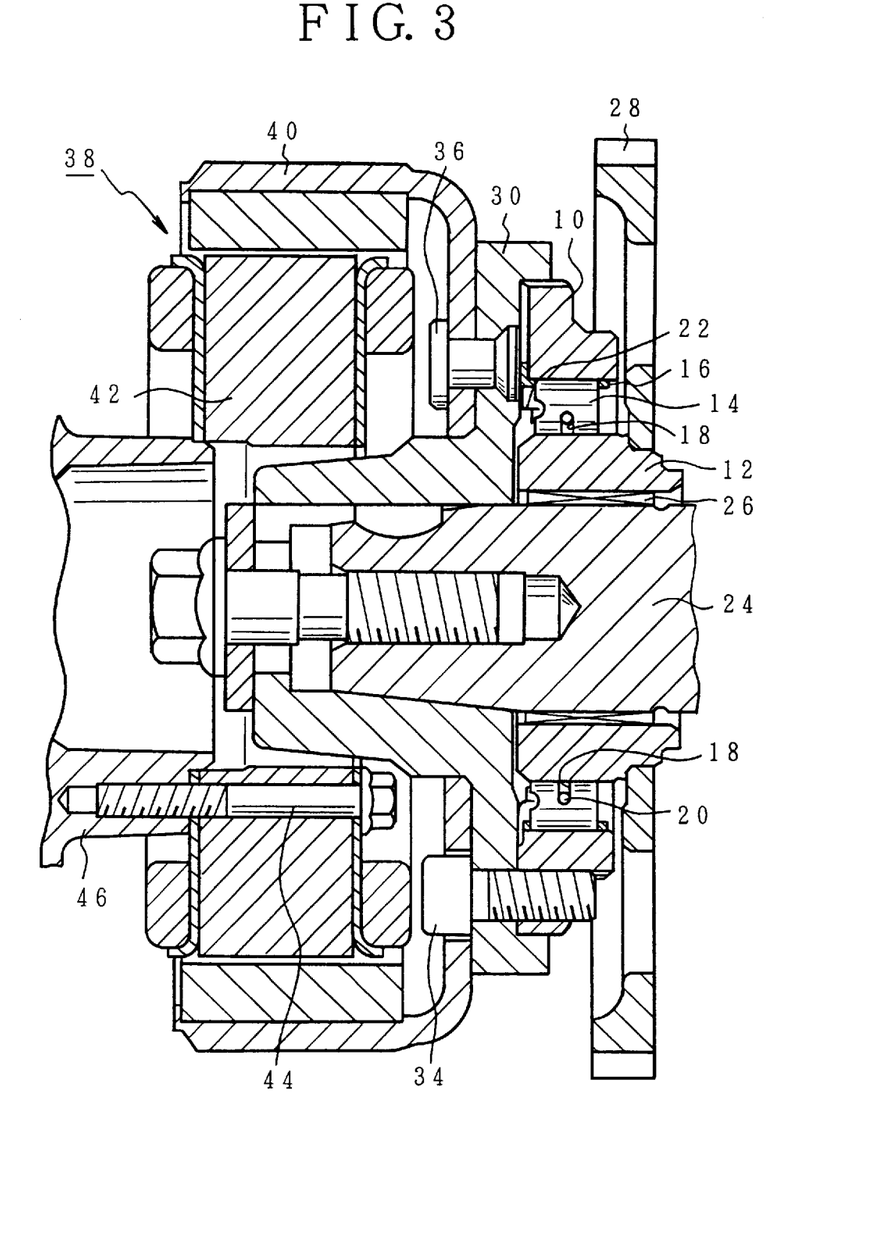
FIG. 3 is a cross sectional view of an assembling structure of a one-way clutch of the invention to an automobile engine.

FIG. 3 shows an embodiment of a one-way clutch of the invention and shows a case where the one-way clutch is provided in a starter mechanism of an engine for an automobile as an example. The one-way clutch of the invention has an outer race 10 and an inner race 12. The inner race 12 is rotatably attached to an axial end of a crank shaft 24 of the engine via a needle bearing 26 and a starter gear 28 is fixed to the right side of the inner race 12. An output gear of a starter motor (not shown) is come into engagement with the starter gear 28. The outer race 10 is fixed to a flange portion of a rotary disk 30 provided on the left side by bolts 34. The bolts 34 are provided at a plurality of positions in the circumferential direction. Further, an AC generator 38 is provided on the left side of the rotary disk 30. A rotor 40 of the AC generator 38 is fixed to the rotary disk 30 by rivets 36. The rivets 36 are also provided at a plurality of positions (not shown) in the circumferential direction. A stator 42 of the AC generator 38 is fixed by bolts 44 to an end portion of a cylindrical casing 46 which is positioned coaxially with the crank shaft 24. A plurality of sprags 14 are arranged in the circumferential direction in a ring-shaped gap between the outer race 10 and the inner race 12 of the one-way clutch. Each sprag 14 is held by a retainer 16. The retainer 16 is a ring-shaped band member formed by punching and contracting a steel plate member and rectangular retaining holes are formed at a predetermined pitch in the circumferential direction. The sprag 14 is fitted into each retaining hole from the inner side and is held between the outer race 10 and the inner race 12 so as to be rotatable on its axis. A groove 18 in the circumferential direction is formed on the inner surface of each sprag 14. A return spring 20 obtained by forming a coil spring in a ring shape is assembled in the groove 18. The sprag 14 is urged in the radial direction by the return spring 20. Further, a friction plate 22 is fixed on the rotary disk 30 side of the retainer 16.

Figure 4:
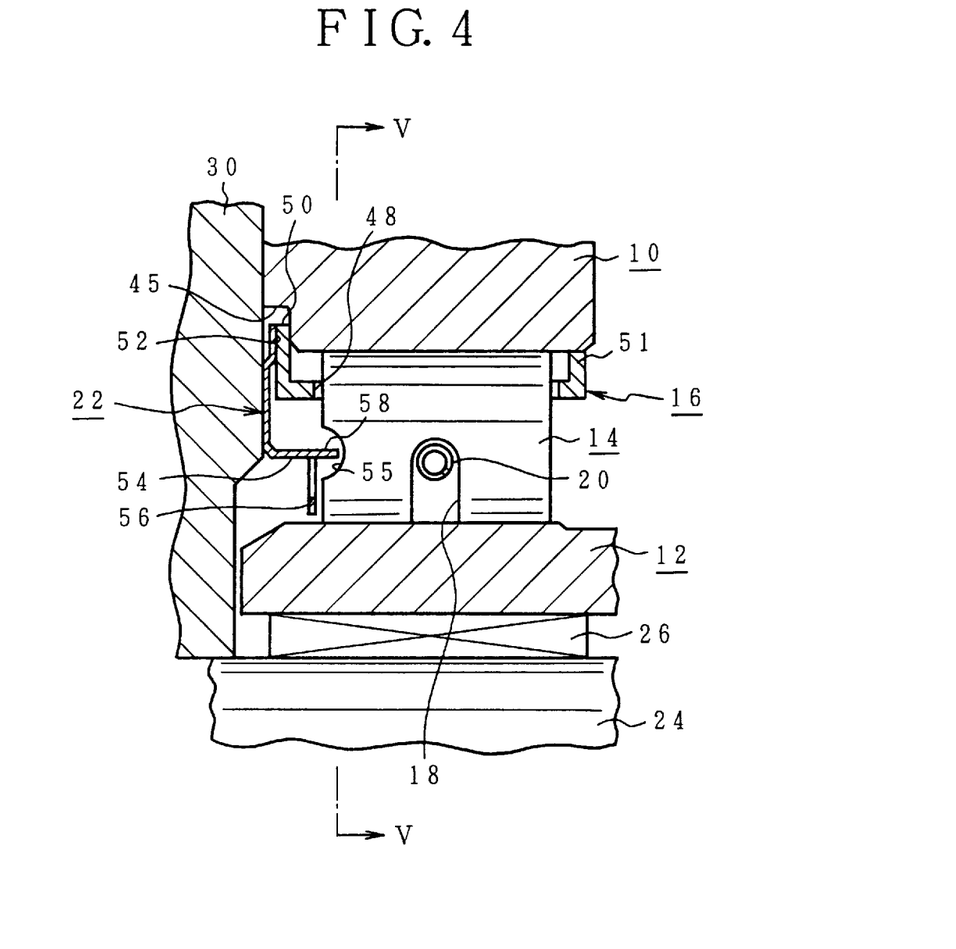
FIG. 4 is a cross sectional view of a part of the one-way clutch of FIG. 3.

FIG. 4 enlargedly shows the portion of the upper sprag 14 in the one-way clutch of FIG. 3. The retainer 16 for retaining the sprag 14 between the outer race 10 and inner race 12 has retaining holes 48 each for enclosing the sprag 14 from the inner side. A flange 50 on the engagement side is formed on the left side of the retainer 16. A flange 51 on the opening side is formed on the right side of the retainer 16. A ring groove 45 is formed in the outer race 10 in correspondence to the flange 50 on the engagement side of the retainer 16. The engagement side flange 50 is fitted into the ring groove 45. On the contrary, the flange 51 on the opening side is in contact with the inner peripheral surface of the outer race 10. The engagement side flange 50 locating on the left side of the retainer 16 restricts the motion of the retainer 16 to the opening side. The opening side flange 51 is come into contact with the inner peripheral surface of the outer race 10 and restricts the motion in the radial direction. When an excessive torque is applied from the inner race 12 in a clutch operative mode, the friction plate 22 slides the retainer 16 and sprag 14 for the outer race 10 and generates a friction to prevent a further torque transmission. The friction plate 22 is fixed to the end surface of the engagement side flange 50 formed on the rotary disk 30 side of the retainer 16 by an outer peripheral flange portion 52 by a spot welding. Subsequent to the outer peripheral flange portion 52 of the friction plate 22, a cylindrical portion 54 contracted to the sprag 14 side is provided and, further, an inner peripheral flange portion 56 which faces the left end surface of the sprag 14 is integratedly formed. A retaining groove 55 is formed on the end surface of the sprag 14 which faces the cylindrical portion 54 of the friction plate 22. A retaining member 58 projected from the cylindrical portion 54 by punching a root portion of the inner peripheral flange portion 56 of the friction plate 22 is located for the retaining groove 55.

Figure 5:
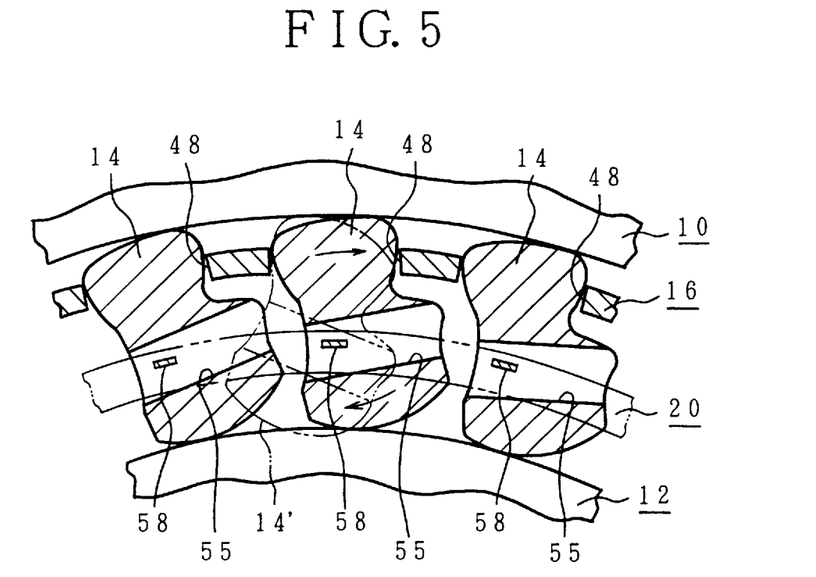
FIG. 5 is a cross sectional view taken along the line V—V in FIG. 4.

FIG. 5 is a cross sectional view taken along the line V—V in FIG. 4 and shows an arrangement state of each retaining member 58 projected from the friction plate 22 for the retaining groove 55 formed on the end surface of the sprag 14. The retaining groove 55 formed on the end surface of the sprag 14 is a straight groove along the circumferential direction. The retaining member 58 projected from the friction plate 22 locating on the outer side is positioned in an almost center of the retaining groove 55 of the sprag 14.

Figure 6:
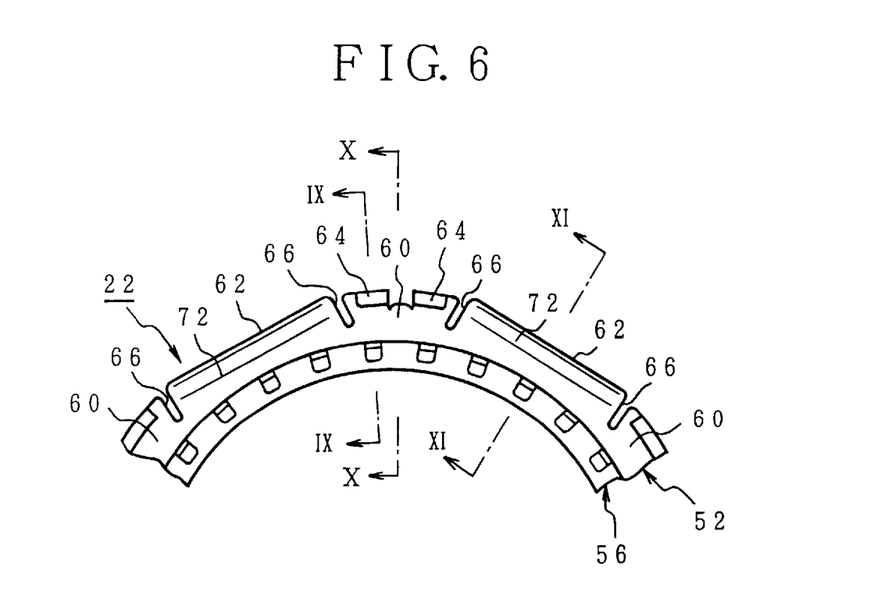
FIG. 6 is a side elevational view showing a part of a friction plate in FIG. 3.

FIG. 6 shows a part of the friction plate 22 in FIG. 4 when it is seen from the left side. In the friction plate 22, a plurality of slits 66 are formed in the radial direction in the outer peripheral flange portion 52, thereby alternately forming attaching members 60 and frictional members 62. Specifically speaking, the attaching members 60 and the frictional members 62 are alternately divisionally formed at six positions, respectively. Concave portions 64 for spot welding to the outer peripheral flange portion 52 (refer to FIG. 4) of the friction plate 22 locating on the back side are formed at two positions in the attaching member 60. On the other hand, a curved rib 72 is formed in the tangential direction on the frictional member 62. The curved rib 72 is come into contact with the end surface of the rotary disk 30 locating on the left side in the assembling state as shown in FIG. 4, thereby enabling a specified friction which determines a limit of the transmission torque to be generated.

Figure 7:
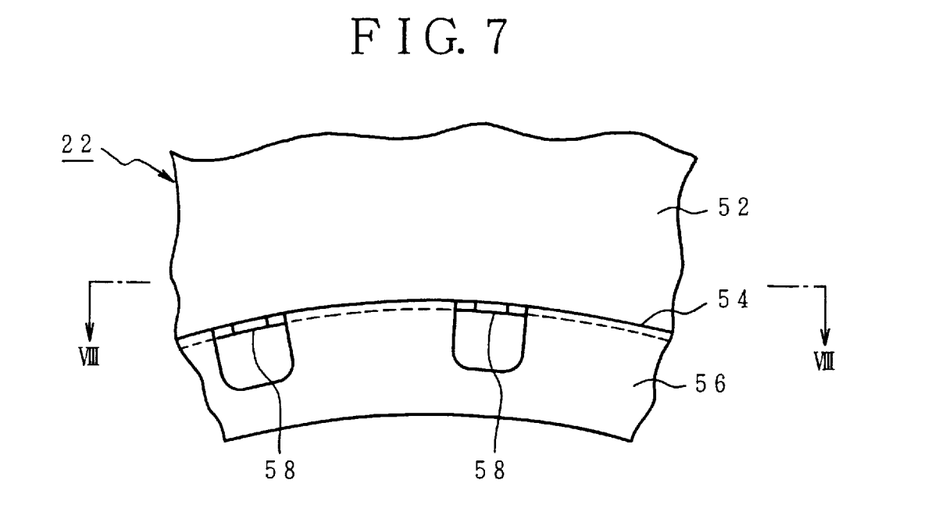
FIG. 7 is a side elevational view showing a part of the inner peripheral side of the friction plate in FIG. 6.
Figure 8:
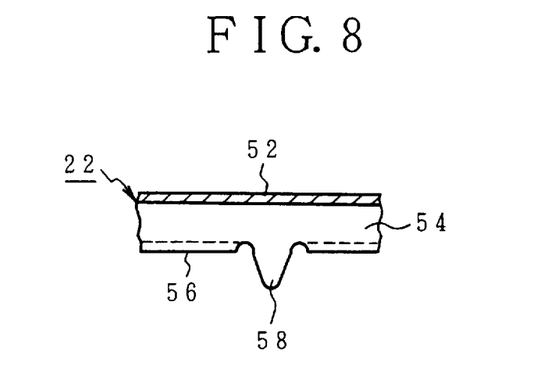
FIG. 8 is a cross sectional view taken along the line VIII—VIII in FIG. 7.

FIG. 7 shows the inner peripheral flange portion 56 side of the friction plate 22 in FIG. 6 when it is seen from the back side of FIG. 6. The retaining member 58 of the friction plate 22 is projected by punching in the axial direction the inner peripheral flange portion 56 which extends to the cylindrical portion 54. The retaining member 58 has an almost triangular shape whose width is gradually narrowed toward the tip as shown in FIG. 8 which is a plan view of FIG. 7. The retaining member 58 provided in the friction plate 22 having such a structure shown in FIGS. 7 and 8 is located in the retaining groove 55 formed on the end surface of the sprag 14 as shown in FIGS. 4 and 5.

The retaining member 58 of the friction plate 22 and the regaining groove 55 of the sprag 14 having the positional relation as shown in FIG. 5 prevent the drop-out of the sprag 14 when the retainer assembly obtained by temporarily assembling the retainer 16, sprag 14, and return spring 20 is assembled between the outer race 10 and the inner race 12. That is, according to the retainer assembly temporarily assembled by fitting the sprag 14 into the retaining hole 48 of the retainer 16 from the inner side and fitting the sprag 14 into the groove 18, each sprag 14 is projected to the outside from the retaining hole 48 of the retainer 16 by the pressing force of the return spring 20 in the radial direction. In order to assemble the retainer assembly into a portion between the outer race 10 and the inner race 12 as shown in FIG. 4, the sprag 14 projected from the retainer 16 has to be depressed to the inside and assembled. In this case, in a conventional retainer assembly, when the sprag 104 is strongly depressed as shown in FIGS. 1 and 2, it is disengaged and dropped out from the retainer 106. It is inconvenient since they have to be reassembled. On the other hand, in the retainer assembly of the invention, when the sprag 14 projected from the retainer 16 is depressed, the movement of the sprag 14 is restricted by the contact of the retaining groove 55 provided on the end surface with the retaining member 58 and the drop-out of the sprag 14 is prevented. When the retainer assembly is assembled between the outer race 10 and the inner race 12, therefore, it can be easily assembled by depressing the sprag 14 so as to be fitted in the inner periphery of the outer race 10 without caring the drop-out of the sprag 14.

The operation of a one-way torque transmission of the one-way clutch of the invention according to the embodiment of FIG. 3 will now be described. When the engine is started, by activating the starter motor (not shown), the starter gear 28 is rotated, so that the inner race 12 is rotated. For example, in FIG. 5, the inner race 12 starts rotating counterclockwise. Since the outer race 10 side is stopped in this instance, the sprag 14 rotates clockwise on its axis as shown by 14' in association with the rotation of the inner race 12, thereby transmitting the torque from the inner race 12 to the outer race 10. The outer race 10 consequently rotates integratedly with the inner race 12 via the sprag 14. Thus, the crank shaft 24 is rotated via the rotary disk 30 and, at the same time, the rotor 40 of the AC generator 38 is also rotated, thereby starting the engine. When an excessive torque exceeding a predetermined friction which is determined by the friction plate 22 is applied in such an operating state of the one-way clutch, the friction plate 22, retainer 16, and sprag 14 slide for the outer race 10, thereby preventing the excessive torque transmission. When the engine is started, the starter motor is stopped and the starter gear 28 and inner race 12 are stopped. When the inner race 12 is stopped, the outer race 10 side rotates counterclockwise by the engine in FIG. 5. The sprag 14 is returned to the position in the initial state shown in the diagram and is disengaged. The outer race 10 and sprag 14 race for the inner race 12 in the stopped state, so that the torque transmission in the opposite direction from the outer race 10 to the inner race 12 is not performed.

Figure 9:
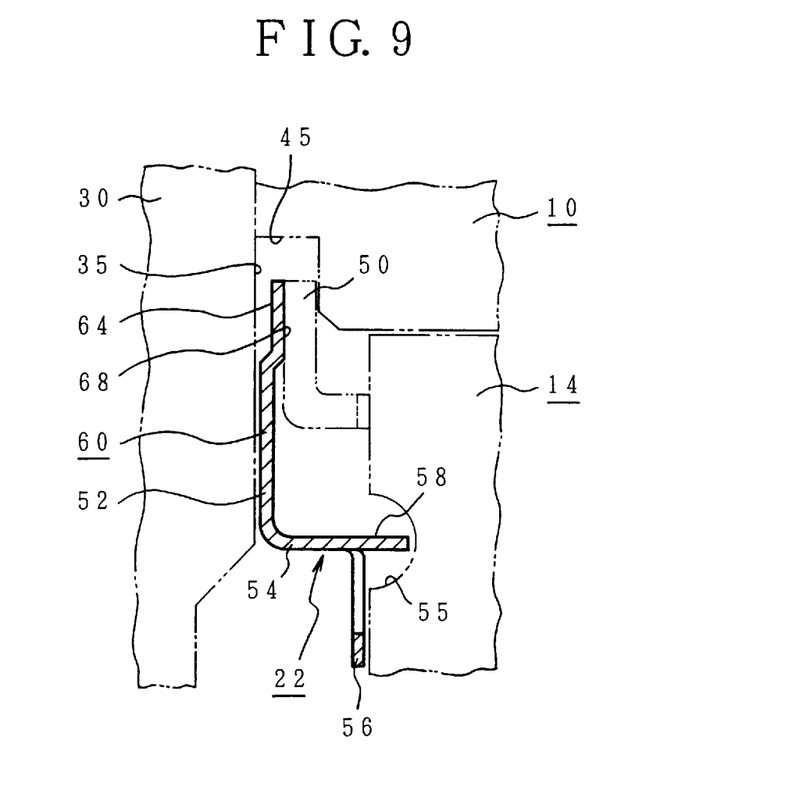
FIG. 9 is a cross sectional view taken along the line IX—IX in FIG. 6.

FIG. 9 is a cross sectional view taken along the line IX—IX of the friction plate 22 shown in FIG. 6 and shows a construction in which the retainer 16 is fixed to the flange 50 on the engagement side by a spot welding. In each of the attaching members 60 separately provided at six positions in the outer peripheral flange portion 52 of the friction plate 22 in FIG. 6, the concave portions 64 are formed at two positions. As shown in FIG. 9, the concave portion 64 has a shape displaced by joggling to the side of the engagement side flange 50 of the retainer 22 which is spot welded for an attaching surface 35 of the rotary disk 30 locating on the left side. The concave portion 64 of the attaching member 60 is spot welded to the flange 50 on the engagement side of the retainer 16 and is fixed by a spot welding portion 68. When the spot welding portion 68 is formed by the spot welding, a rise usually occurs on the outside of the spot welding portion 68. For the rise on the outside of the spot welding portion 68, the spot welding is executed in the concave portion 64 joggled down for the attaching surface 35 of the rotary disk 30 in the attaching member 60 of the friction plate 22 in FIG. 9. Consequently, even if the rise occurs, it is not come into contact with the attaching surface 35 of the rotary disk 30. Thus, a situation such that the rise of the friction plate 22 by the spot welding is come into contact with the attaching surface 35 of the rotary disk 30 and the friction which determines the limit of the transmission torque is fluctuated due to the rise caused by the spot welding.

Figure 10:
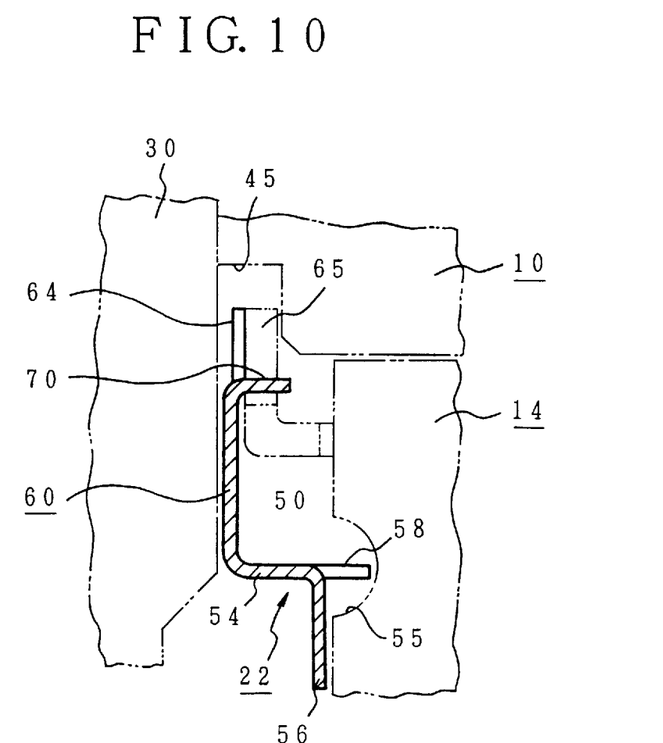
FIG. 10 is a cross sectional view taken along the line X—X in FIG. 6.

FIG. 10 is a cross sectional view taken along the line X—X in FIG. 6. In this portion, the friction plate 22 has a rib 70 which is bent at a right angle. A positioning groove 65 is formed in the flange 50 on the engagement side of the retainer 16 in correspondence to the rib 70. The positioning groove 65 is come into engagement with the rib 70, thereby positioning the friction plate 22 for the retainer 16. That is, when the friction plate 22 is spot welded to the flange 50 on the engagement side of the retainer 16, by fitting the rib 70 of the friction plate 22 into the positioning groove 65 of the retainer 16, the retainer 16 and friction plate 22 are engaged with each other. Thus, the relative positioning at the time of the spot welding can be certainly executed.

Figure 11:
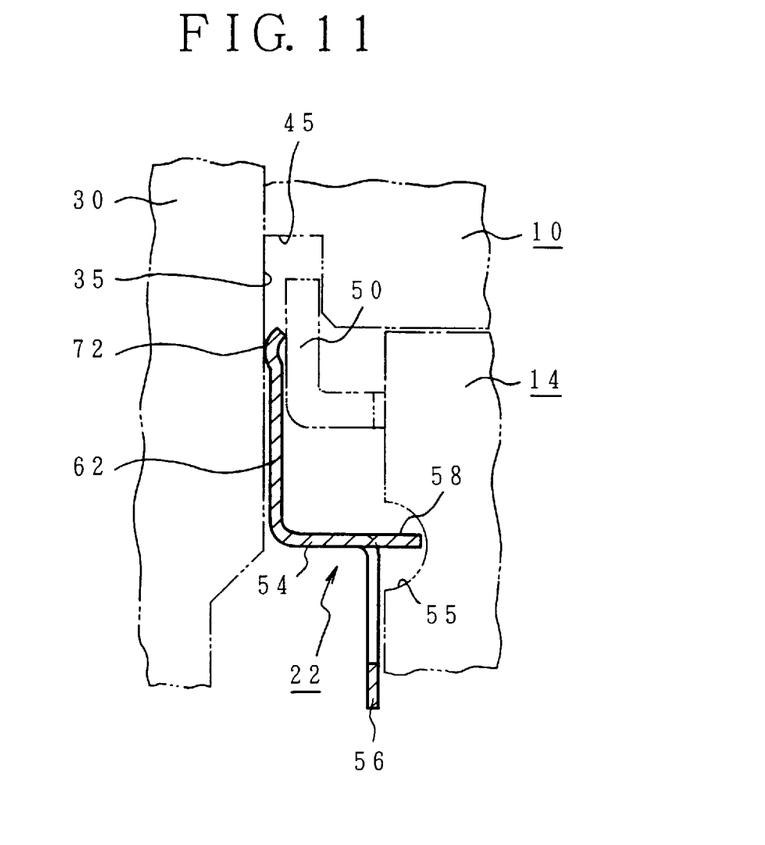
FIG. 11 is a cross sectional view taken along the line XI—XI in FIG. 6.

FIG. 11 is a cross sectional view taken along the line XI—XI in FIG. 6 and shows a cross sectional structure of the frictional member 62 formed in the friction plate 22. The frictional member 62 of the friction plate 22 has the curved rib 72 which is pressed against the attaching surface 35 of the rotary disk 30 on the front end side. The curved rib 72 of the friction plate 22 is pressed against the attaching surface 35 of the rotary disk 30 in the assembling state. When the curved rib 72 receives the torque transmitted from the retainer 16 side via the sprags 14, a strong frictional force is generated, thereby rotating the retainer 16 integratedly with the outer race 10. However, when an excessive torque exceeding the specified frictional force that is generated by the friction plate 22 is applied, the friction plate 22 and retainer 16 slide for the outer face 10 and rotary disk 30. In association with it, the sprag 14 which rotates on its axis between the outer race 10 and the inner race 12 and transmits the torque also slides, thereby preventing a transmission of the excessive torque.

Figure 12:
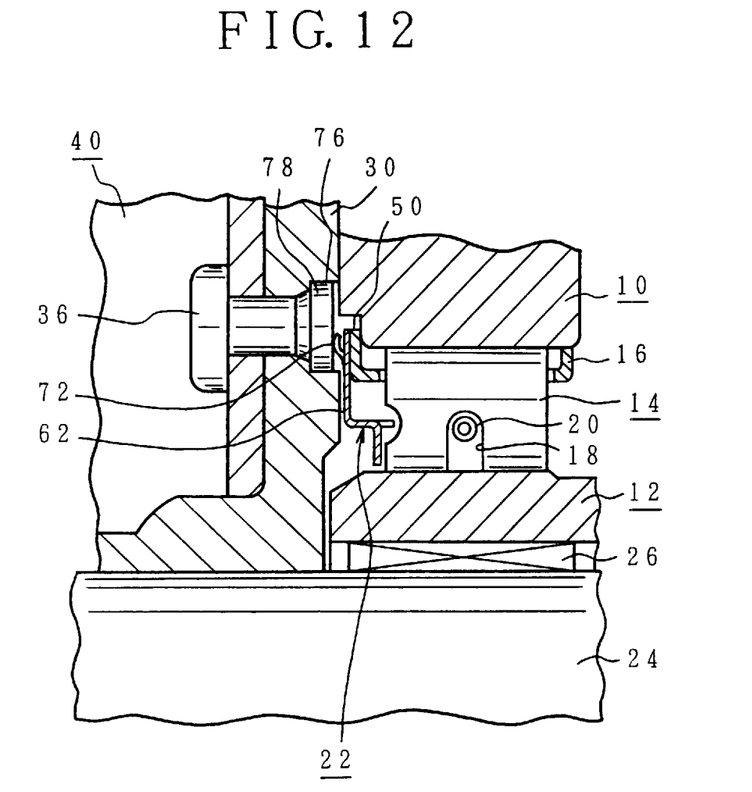
FIG. 12 is a cross sectional view of a rivet fixing portion in FIG. 3.
Figure 13:
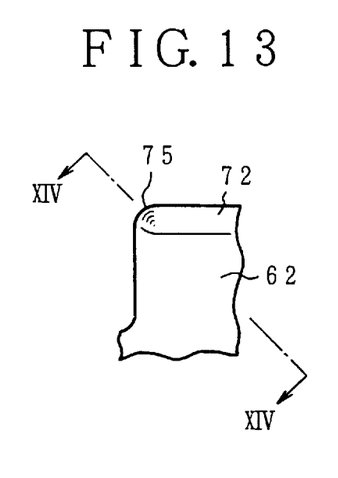
FIG. 13 is an enlarged diagram of a corner edge of a frictional member in FIG. 6.
Figure 14:
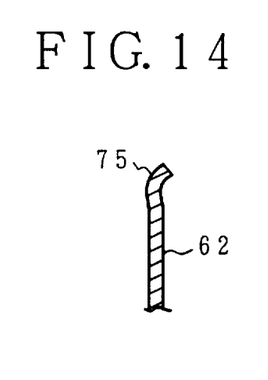
FIG. 14 is a cross sectional view taken along the line XIV—XIV in FIG. 13.

FIG. 12 shows a state in which the curved rib 72 formed in the fictional member 62 of the friction plate 22 shown in FIG. 11 is located in a rivet hole portion of the rivet 36 which fixes the rotor 40 of the AC generator to the rotary disk 30. When the excessive torque is applied during the operation of the one-way clutch, the friction plate 22 slides together with the retainer 16 and sprag 14, a state such that a corner edge portion of the frictional member 62 of the friction plate 22 shown in FIG. 6 enters a rivet hole 76 as shown in FIG. 12 occurs. When the corner edge of the curved rib 72 enters the rivet hole 76 as mentioned above, there is a fear such that the corner edge thrusts into the periphery of the rivet hole 76 when it comes off and the friction by the curved rib 72 differs from a predetermined value and the excessive torque is consequently transmitted. In order to prevent it, as shown in FIG. 13, the corner edge portion of the curved rib 72 formed in the frictional member 62 is formed as a corner edge spherical portion 75. The corner edge spherical portion 75 forms a part of a sphere as shown in FIG. 14 which is a cross sectional view taken along the line XIV—XIV. Consequently, even if the clutch slides due to the excessive torque and the corner edge spherical portion 75 enters the rivet hole 76, since the corner edge spherical portion 75 is formed in a spherical shape, it can smoothly go out without thrusting into the periphery of the rivet hole 76, so that the predetermined friction value can be stably maintained. Such a spherical portion is formed to also prevent the thrust of the corner edge of the curved rib 72.

Figure 15:
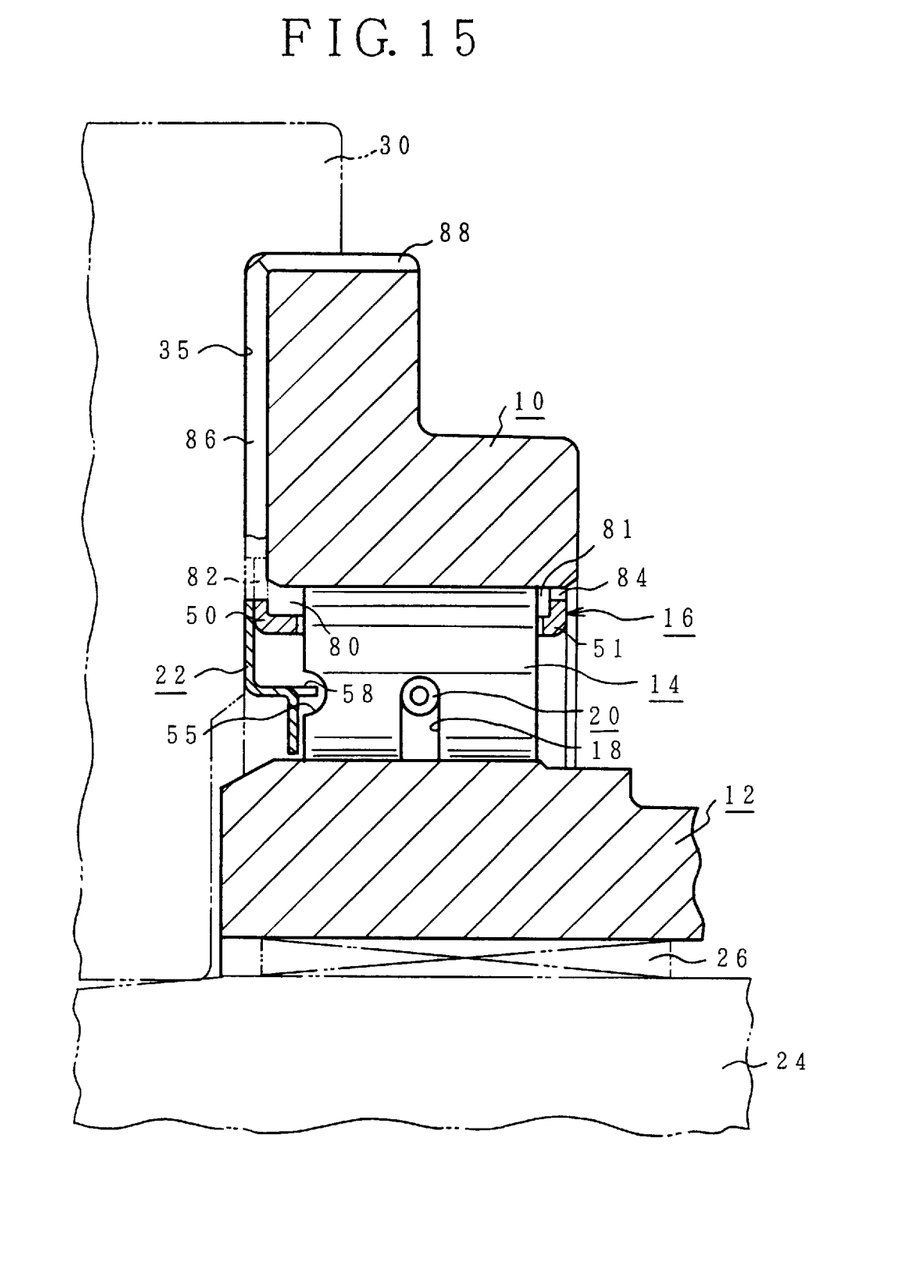
FIG. 15 is a cross sectional view showing a portion in which a lubrication passage is formed in FIG. 3.

FIG. 15 shows a structure for lubrication in the embodiment of FIG. 3. When a plurality of sprags 14 are assembled between the inner race 12 and the outer race 10 by the retainers 16 to which the friction plate 22 is fixed and the return spring 20, space 80 and 81 which are partitioned by the outer race 10, retainers 16, and sprags 14 are formed. A lubricating oil is supplied from the inner side to the spaces 80 and 81 through the gaps among the above component elements by a centrifugal force in association with the rotation of the crank shaft 24. When the spaces 80 and 81 are closed to the outer periphery side for the supply of the lubricating oil, the lubricating oil cannot flow and dusts and the like are deposited, so that a lubricating performance of the sprag 14 deteriorates and it is apprehended that the sprag 14 is damaged by the dusts. According to the invention, therefore, notches 82 are formed in the flange 50 on the engagement side of the retainer 16 and also notches 84 are formed on the flange 51 on the opening side.

Figure 16:
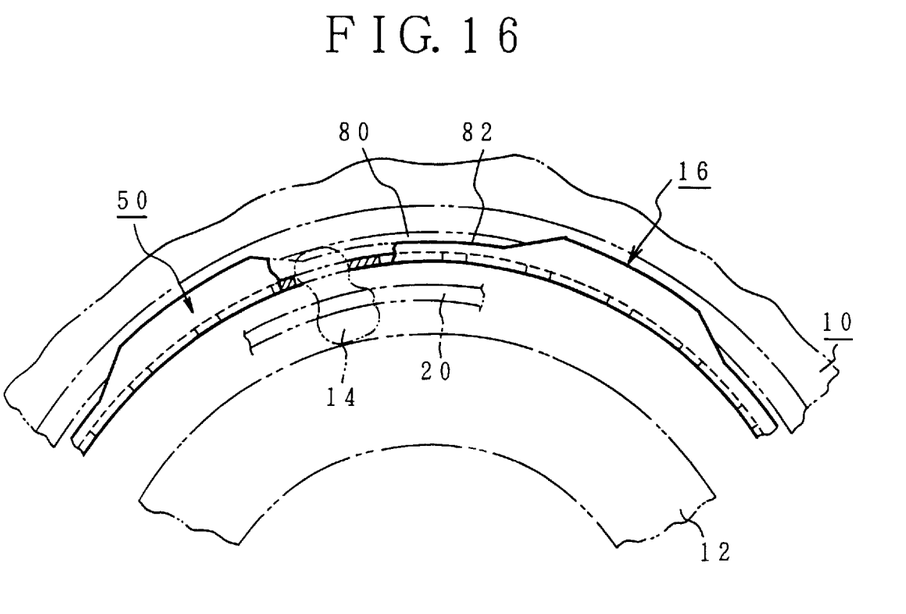
FIG. 16 is an explanatory diagram when a retainer in FIG. 15 is seen from the left side.

FIG. 16 shows a part of the flange 50 on the engagement side in FIG. 15 when it is seen from the left side. The notches 82 are formed at regular intervals in the ring-shaped flange 50 on the engagement side. Specifically speaking, the notches 82 are separately formed at six positions on the outer periphery of the flange 50 on the engagement side. The space 80 on the inner side of the outer race 10 is, therefore, opened to the side by the formation of the notches 82.

Figure 17:
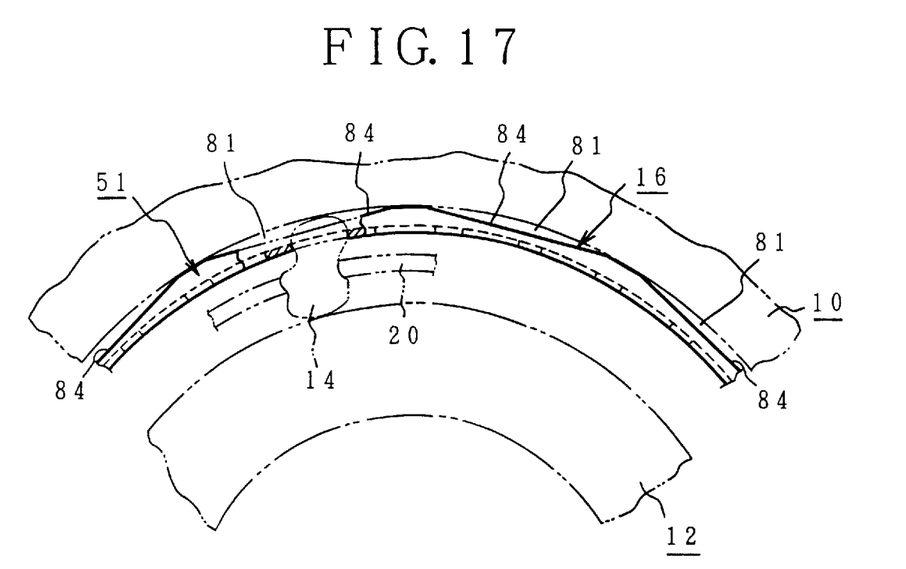
FIG. 17 is an explanatory diagram when the retainer in FIG. 15 is seen from the right side.

FIG. 17 shows a part of the flange 51 on the opening side in FIG. 15 when it is seen from the right side. The notches 84 obtained by cutting the outer peripheral portion of the flange 51 on the opening side are formed on the flange 51 at regular intervals at, for example, 12 positions so as to be inscribed in the inner peripheral portion of the outer race 10. By forming the notches 84, the space 81 on the inner side of the outer race 10 is opened to the outside.

Referring again to FIG. 15, grooves 86 formed in the radial direction of the end surface of the outer race 10 facing the attaching surface 35 of the rotary disk 30 are communicated with the notches 82 formed in the engagement side flange 50 on the left side of the retainer 16. The grooves 86 are further communicated with grooves 88 formed in the axial direction in the outer peripheral portion.

Figure 18:
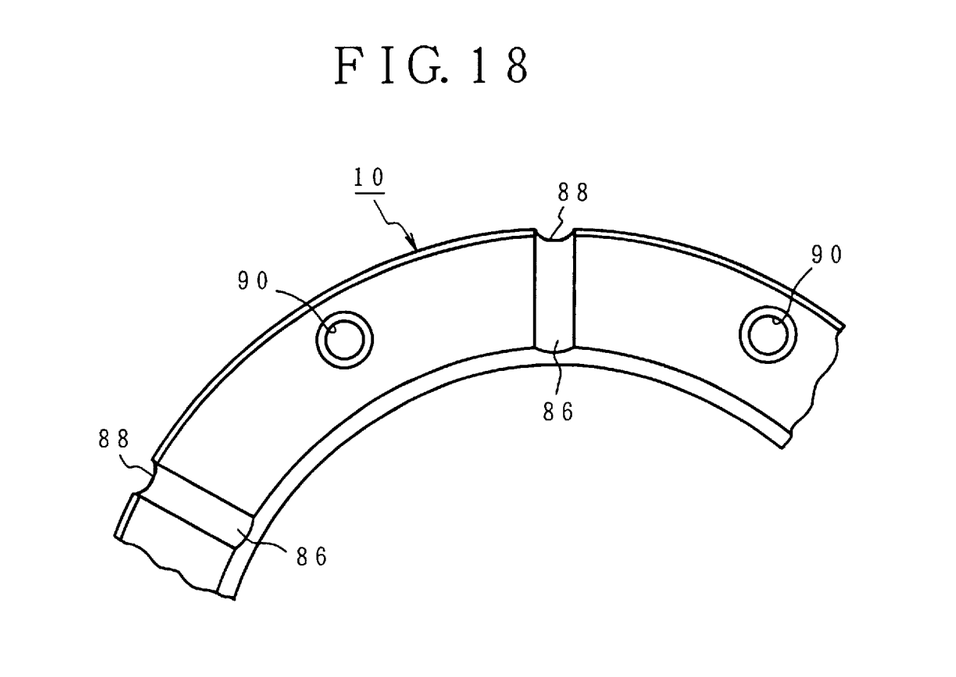
FIG. 18 is an explanatory diagram of an attaching surface of an outer race in FIG. 15.
Figure 19:
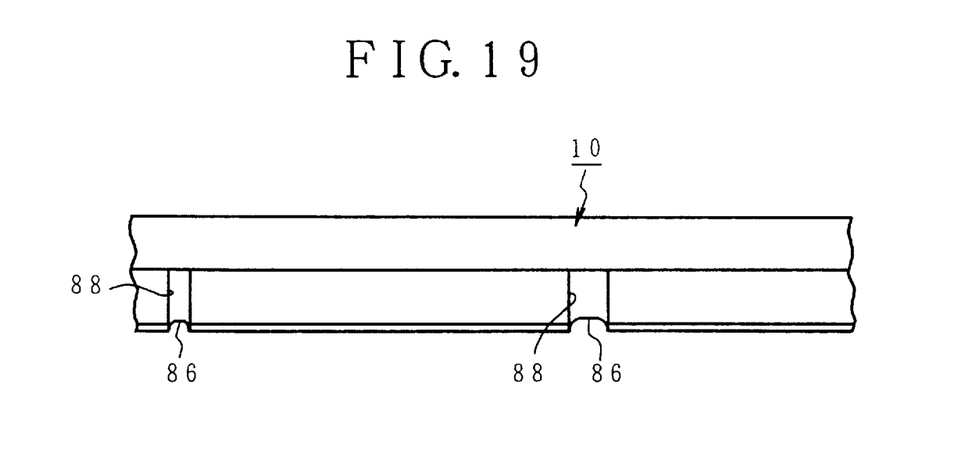
FIG. 19 is a plan view of FIG. 18.

FIG. 18 shows a part of the outer race 10 when it is seen from the attaching surface side for the rotary disk 30. The grooves 86 are formed in the radial direction and are connected to the grooves 88 in the axial direction on the outer peripheral portion. The grooves 86 in the radial direction are arranged, for example, at six positions on the end surface of the outer race 10 at regular intervals. Screw holes 90 are formed to attach the outer race 10 to the rotary disk 30 by screwing the bolts 34 into the screw holes 90 as shown in FIG. 3. FIG. 19 is a plan view of FIG. 18. The grooves 88 communicating with the outer periphery of the outer race 10 in the axial direction are formed subsequent to the grooves 86 formed in the radial direction.

By forming such lubricating paths opening to the outer periphery side for the spaces 80 and 81 partitioned by the outer race 10, sprag 14, and retainer 16 as shown in FIG. 15, the supply and discharge of the lubricating oil for the spaces 80 and 81 are slightly weakened, thereby improving the lubricating performance. It is certainly prevented that the sprag 14 and the like are damaged by convection of dusts. That is, by receiving the centrifugal force by the rotation of the crank shaft 24, the lubricating oil passes through the gaps among the above component elements and is supplied from the inner side to the spaces 80 and 81 on both sides among the retainers 16, sprags 14, and outer race 10. The lubricating oil supplied to the left space 80 passes through the notch 82, groove 86, and further, groove 88 and is discharged to the outer peripheral side. The lubricating oil supplied to the space 81 is directly discharged from the notch 84 to the outer peripheral side. Consequently, the lubricating oil passing the notches 82 and 84 can be smoothly supplied, the lubricating performance for the sprag 14 is improved, and no dust is deposited in the spaces 80 and 81, so that the damage of the sprag 14 by dusts can be also certainly prevented.

According to the invention as mentioned above, since the retaining member is projected from the friction plate fixed to the end portion of the retainer and is located in the engaging groove on the end surface of the sprag, when the retainer assembly in which a number of sprags are temporarily assembled to the retainers by the return spring is assembled between the outer race and the inner race, even if the sprag is depressed, the sprag is not dropped out. Consequently, the retainer assembly can be easily assembled between the outer race and the inner race without needing any skill. By providing the notches in the flange portions locating on both sides of the retainer and by forming the grooves communicating with the notches on the outer race side, the lubricating performance for the spaces partitioned by the outer race, retainers, and sprags is improved and the sprags can be certainly prevented from being damaged by the stagnation of dusts. Since the portion of the attaching member of the friction plate which is spot welded to the flange portion of the retainer is recessed backward by the joggling in a downward stairway manner for the contact surface, even if the rise is produced by the spot welding, no contact occurs. Thus, the stable friction determining the limit of the transmission torque can be guaranteed. Further, even when the clutch slides by receiving the excessive torque and the corner edge of the frictional member formed divisionally in the outer peripheral portion of the friction plate enters the assembling position such that it is dropped in the rivet hole of the rotary member to which the outer race is attached, by forming the corner edge of the frictional member in a spherical shape, the thrust occurring when the corner edge comes out of the rivet hole is prevented. Consequently, the friction occurring in the friction plate can be stabilized.

Although the one-way clutch provided in the starter mechanism for the automobile has been described as an example in the above embodiment, the invention is not limited to the embodiment. The one-way clutch of the invention can be also applied as it is to a proper transmission mechanism in which a transmission of a power rotation in one direction is needed between a pair of rotary members. The invention is not limited by the numerical values shown in the embodiment.

What is claimed is:

1. A one-way clutch which is interposed between a first rotary member and a second rotary member which relatively rotate and transmits a torque only in one direction, comprising:

an outer race connected to said first rotary member;

an inner race which is coaxially arranged on the inner side of said outer race via a predetermined ring-shaped gap and is fixed to said second rotary member;

a plurality of sprags which are assembled in the ring-shaped gap between said outer race and said inner race and are arranged in the circumferential direction;

a retainer in which retaining holes for enclosing said plurality of sprags are formed at predetermined intervals in the circumferential direction and said sprags are arranged at a predetermined pitch in the circumferential direction in the ring-shaped gap between said outer race and said inner race in a state where said sprags are respectively assembled in said retaining holes from the inner side;

a ring-shaped return spring for urging said plurality of sprags assembled in the retaining holes of said retainer in the radial direction from the inner peripheral side and for rotating said sprags in a direction such that the outer race and the inner race come into engagement with each other;

a friction plate which is sandwiched between said outer race and said first rotary member in a state where said friction plate is fixed to an end surface of said retainer and which generates a frictional force for restricting a slide of said retainer and said sprags for said outer race;

retaining grooves which are formed on end surfaces of said plurality of sprags locating on the friction plate arrangement side and extend in the circumferential direction; and a plurality of retaining members which are positioned so as to be projected from said friction plate into the retaining grooves of said sprags and restrict a drop-out of each sprag upon assembly.

2. A one-way clutch according to claim 1, wherein each of the retaining members of said friction plate has a triangular shape whose width is gradually narrowed toward a tip.

3. A one-way clutch according to claim 1, wherein a pair of flanges adapted to be fitted into said outer race locating in the outside are integratedly formed on both side edges of an outer peripheral portion of said retainer and a lubrication passage for communicating a space surrounded by said outer race, said retainer, and said sprag with an outside and recirculating a lubrication oil is provided for each of said pair of flanges.

4. A one-way clutch according to claim 3, wherein a notch is formed as said lubrication passage in each of said pair of flanges provided at both side edges of said retainer.

5. A one-way clutch according to claim 4, wherein grooves for communicating the notch formed on one of the flanges of said outer race with a space of an outer periphery are formed on the end surface and the outer peripheral surface of said outer race fixed to said first rotary member.

6. A one-way clutch according to claim 1, wherein said friction plate is divided into a plurality of regions by forming slits in the radial direction at predetermined intervals in the outer periphery, and an attaching member to be fixed to said outer race and a frictional member which is sandwiched between said first rotary member and said outer race and generates a frictional force which restricts a slide of said retainer and said sprags are alternately formed in each of said divided regions.

7. A one-way clutch according to claim 6, wherein in the attaching member of said friction plate, a welding portion which is recessed by joggling in a downward stairway manner to said retainer side for the attaching surface of said first rotary member is formed and said welding portion is fixed to the retainer side by a welding in a state where a gap is formed between the welding portion and the attaching surface of said first rotary member.

8. A one-way clutch according to claim 6, wherein in the frictional member formed in the outer peripheral portion of said friction plate, a curved rib which is come into contact with the attaching surface of said first rotary member is formed in the circumferential direction and said curved rib locating at a corner edge partitioned by said slit in the radial direction is formed in a spherical shape.

9. A one-way clutch according to claim 1, wherein said first rotary member is a connecting member for fixing said outer race to an axial end of a crank shaft and said second rotary member is a starter gear fixed to said inner race which is rotatably attached to the end portion of said shaft of an engine for a vehicle via a bearing.

10. A one-way clutch according to claim 9, wherein a rotor of an AC generator is further fixed to said connecting member for connecting said outer race to said crank shaft.

* * * * *